H. S. PIERCE.
MEANS FOR TAKING UP DRIVE CHAINS.
APPLICATION FILED FEB. 18, 1916.
1,198,869.
Patented Sept. 19, 1916.
2 SHEETS—SHEET 1.
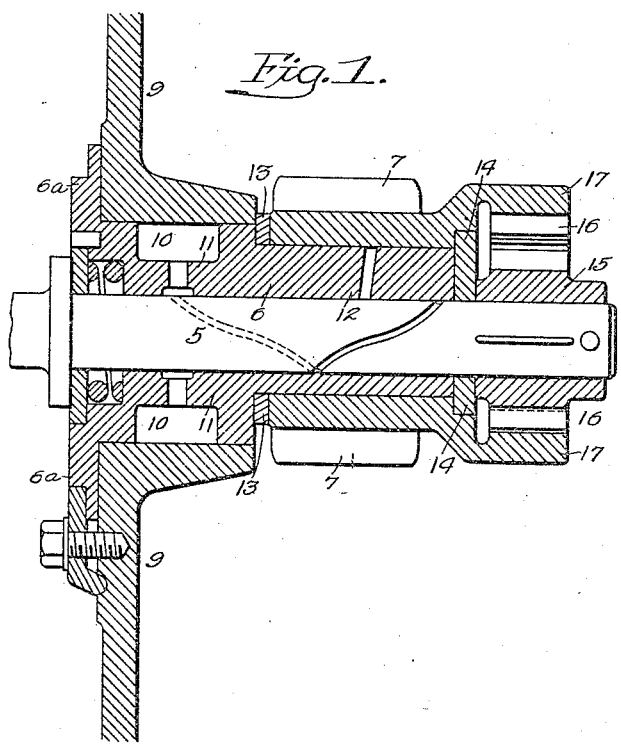
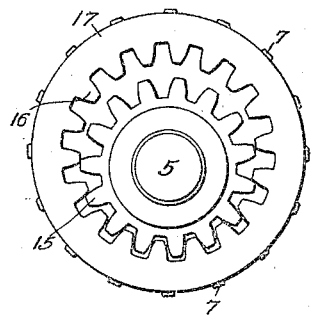
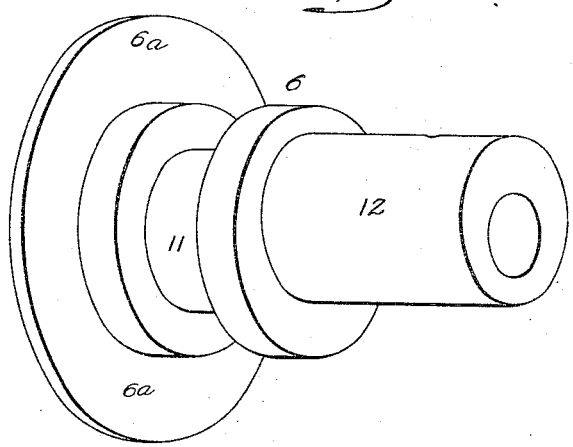
Inventor
Harold S. Pierce
by his Attorneys

H. S. PIERCE.
MEANS FOR TAKING UP DRIVE CHAINS.
APPLICATION FILED FEB. 18, 1916.

1,198,869.

Patented Sept. 19, 1916.
2 SHEETS—SHEET 2.

Inventor:
Harold S. Pierce
by his Attorneys

United States Patent Office.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

MEANS FOR TAKING UP DRIVE-CHAINS.

1,198,869.	Specification of Letters Patent.	Patented Sept. 19, 1916.

Application filed February 18, 1916. Serial No. 79,107.

*To all whom it may concern:*

Be it known that I, HAROLD S. PIERCE, a citizen of the United States, residing in Philadelphia, Pennsylvania, have invented certain Improvements in Means for Taking Up Drive-Chains, of which the following is a specification.

This invention is particularly adapted for use in connection with the drive chains used in connecting an automobile crank shaft with the cam and pump shafts, but it will be understood that the invention can be applied to other machines without departing from the essential features of the invention.

The object of the present invention is to provide a simple and effective device for taking up the slack of the drive chain without changing the relative position of the shafts driven by the chain.

Figure 4:
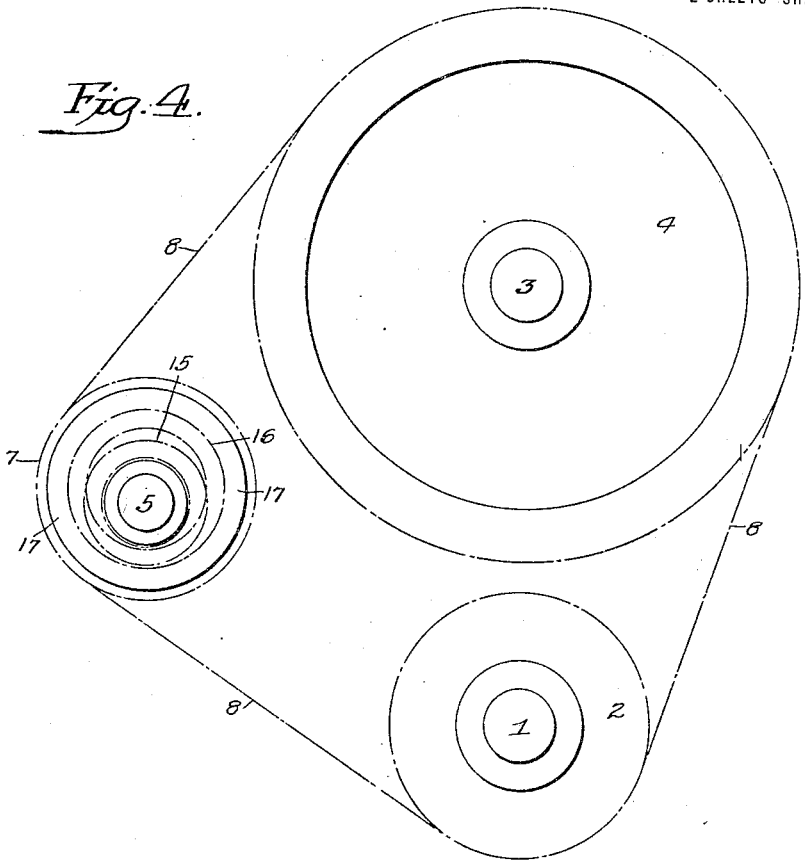
Figure 5:
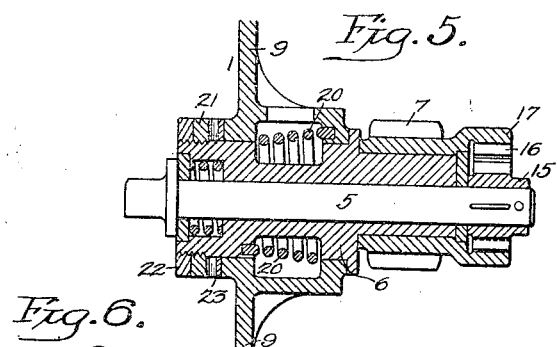
Figure 6:
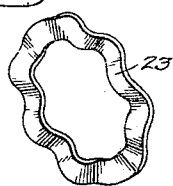

In the accompanying drawings:—Figure 1, is a longitudinal sectional view of my improved means for taking up the slack of drive chains; Fig. 2, is an end view; Fig. 3, is a perspective view of the bearing; Fig. 4, is a diagrammatic view showing the relation of the shafts and the drive chain; Fig. 5, is a view of an automatic take up combined with my invention; and Fig. 6, is a perspective view of a spring washer used in the construction shown in Fig. 5.

Referring in the first instance to the diagram, 1 is the crank shaft having a sprocket wheel 2. 3 is a cam shaft having a sprocket wheel 4. 5 is the pump or magneto shaft mounted in a bearing 6 on which is a sprocket wheel 7. A chain 8 passes around the several sprocket wheels and by adjusting the bearing 6 carrying the sprocket wheel 7 the slack of the chain 8 can be taken up. The several shafts are mounted in a frame 9 forming part of the engine casing, in the present instance. In the frame 9 is a cylindrical opening 10, in which is mounted the cylindrical portion 11 of the bearing 6 having a flange 6ª which is secured to the frame. Projecting from this cylindrical portion of the bearing is an eccentric portion 12 on which the sprocket wheel 7 is mounted, and between the sprocket wheel and the frame is a washer 13.

The shaft 5 extends through the portions 11 and 12 of the bearing and through a washer 14. The center line of the shaft is concentric with a center line through the opening 10 in the frame 9, so that, when the bearing 6 is turned, the relation of the shaft 5 with the frame is not disturbed and the shaft 5 always remains in the same relative position in respect to the shafts 1 and 3. Secured to the end of the shaft 5 is a pinion 15 which meshes with internal teeth 16 on an extension 17 of the sprocket wheel 7, so that any motion imparted to the sprocket wheel 7 will be communicated to the shaft 5 through the gearing 15 and 16. The relative diameters of the two parts of the gearing may be varied so that the shaft 5 can be driven at different speeds from the sprocket wheel 7.

The gearing between the sprocket wheel 7 and the shaft 5 form what I term a "flexible gearing," that is the bearing can be adjusted so as to take up the slack of the chain without interfering with the driving connection between the sprocket wheel and the shaft. By constructing the take-up mechanism in the manner shown, so that the shaft 5 extends through the eccentric portion of the bearing 6 and through the sprocket wheel 7, the device can be located in a comparatively small space and it can be adjusted to such an extent as to take up wear of the chain until it is necessary to either renew the chain or remove a link.

In Fig. 5, I have illustrated an automatic take-up in which a spring 20 is located between the frame and the bearing 6, one end of the spring being attached to the bearing and the other end being attached to the frame so that the tendency of the spring is to turn the bearing and take up the slack as the chain wears. On the rear end of the bearing is a nut 21 and a jam nut 22, and between the nut 21 and the frame is a spring washer 23, Fig. 6, which will flexibly hold the bearing against the frame, but the pressure will not prevent the automatic taking up by the spring.

I claim:—

1. The combination in means for taking up the slack of drive chains, of a frame having a cylindrical opening therein; a bearing mounted in the opening and having a projecting eccentric portion; a shaft mounted concentric with the opening in the frame and extending through the bearing and the eccentric portion thereof; a sprocket wheel loosely mounted on the eccentric portion of the bearing and having internal gear teeth at one end thereof extending beyond the eccentric portion of the bearing; and a pinion secured to the end of the shaft having teeth meshing with the gear teeth on the sprocket wheel and forming a connection between the sprocket wheel and the shaft.

2. The combination of a frame having a cylindrical opening therein; an adjustable bearing mounted in the opening and having an eccentric projecting portion beyond the frame; means for retaining the bearing in the position to which it is adjusted; a shaft extending through the bearing and through the eccentric portion thereof, the shaft being concentric with the opening in the frame; a sprocket wheel loosely mounted on the eccentric portion of the bearing and having an annular portion projecting beyond the end of the bearing, said annular portion having internal teeth thereon; a washer located on the shaft and at the end of the bearing and engaging the sprocket wheel; and a pinion secured to the end of the shaft, the teeth of the pinion meshing with the internal teeth on the sprocket wheel and forming a flexible connection between the sprocket wheel and the shaft.

3. The combination in means for taking up the slack in drive chains, of a frame having a cylindrical opening therein; a bearing mounted in the opening and having a projecting eccentric portion; a shaft mounted concentric with the opening in the frame and extending through the bearing; a coiled spring attached to the bearing and to the frame and tending to turn the bearing in one direction; and a sprocket wheel loosely mounted on the eccentric portion of the bearing and flexibly coupled to the shaft.

4. The combination in means for taking up the slack in drive chains, of a frame having a cylindrical opening therein; a bearing mounted in the opening and having a projecting eccentric portion; a shaft mounted concentric with the opening in the frame and extending through the bearing; a coiled spring attached to the bearing and to the frame and tending to turn the bearing in one direction; a sprocket wheel loosely mounted on the eccentric portion of the bearing and flexibly coupled to the shaft; a nut on the inner end of the bearing; and a spring washer between the nut and the frame tending to hold the bearing in frictional contact with the frame.

HAROLD S. PIERCE.